M. J. BRIERTY.
THERMOSTATICALLY CONTROLLED APPARATUS.
APPLICATION FILED DEC. 22, 1911.
1,033,529.
Patented July 23, 1912.
2 SHEETS—SHEET 1.
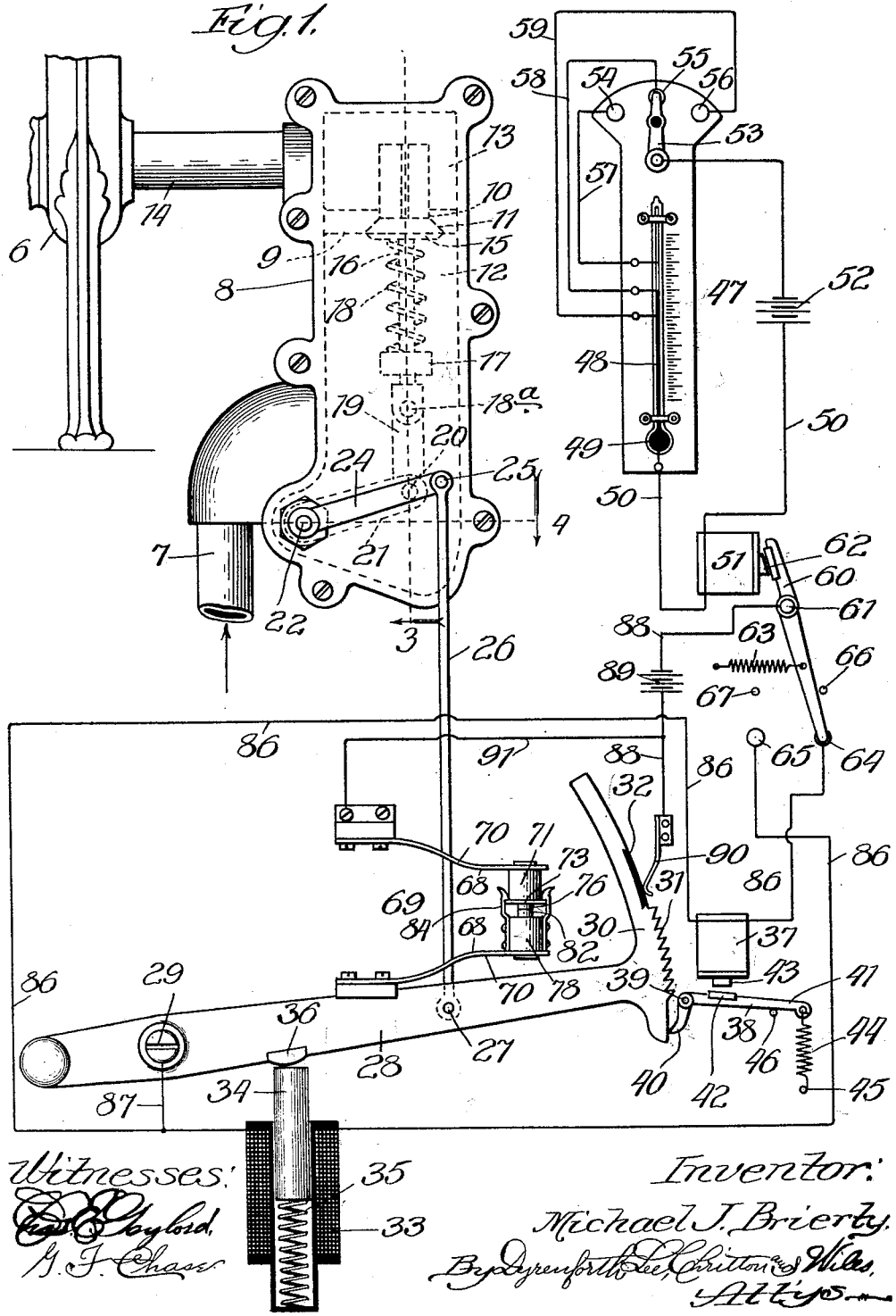
Fig. 1.
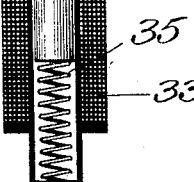
Witnesses:
Inventor:
Michael J. Brierty,
By Dyrenforth, Lee, Chritton & Wiles,
Attys.

M. J. BRIERTY.
THERMOSTATICALLY CONTROLLED APPARATUS.
APPLICATION FILED DEC. 22, 1911.
1,033,529.  Patented July 23, 1912.
2 SHEETS—SHEET 2.
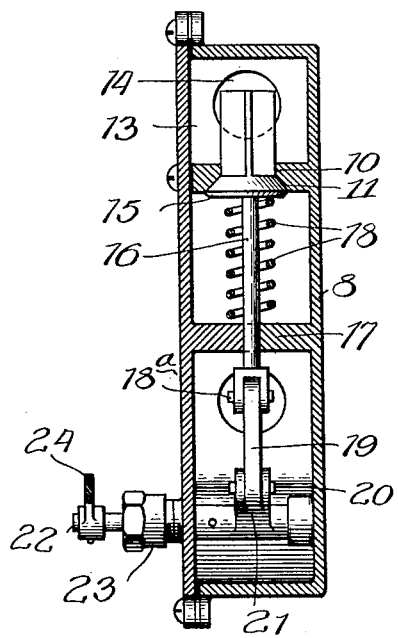
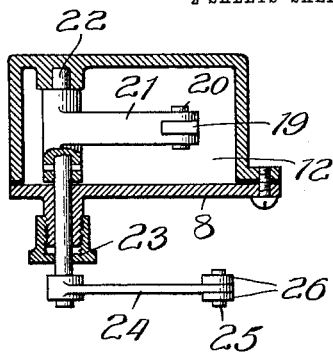
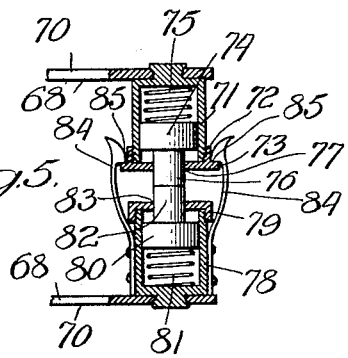
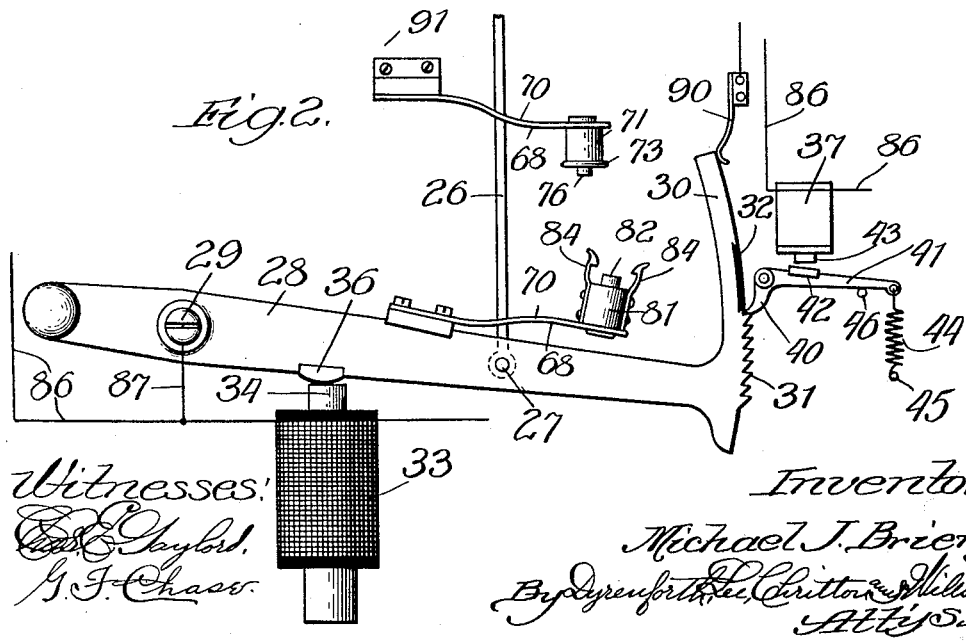

UNITED STATES PATENT OFFICE.

MICHAEL J. BRIERTY, OF CHICAGO, ILLINOIS.

THERMOSTATICALLY-CONTROLLED APPARATUS.

1,033,529. Specification of Letters Patent. Patented July 23, 1912.

Application filed December 22, 1911. Serial No. 667,344.

*To all whom it may concern:*

Be it known that I, MICHAEL J. BRIERTY, a citizen of the United States, residing at Chicago, in the county of Cook and State of Illinois, have invented a new and useful Improvement in Thermostatically - Controlled Apparatus, of which the following is a specification.

My invention relates generally to thermostatically-controlled means for automatically regulating the temperature of the air in a room or regulating the temperature of a fluid; my invention being devised for use, more particularly, (though not to the exclusion of such other uses thereof as will be manifest to those skilled in the art), in connection with steam or hot water radiators for automatically operating the valves thereof to control the admission of steam or hot water thereto, as the case may be, for maintaining the air in the room in which the radiator is located, at a given temperature; and my objects, generally stated, are to provide simple and positively operating means for the purposes stated which shall require the use of the minimum amount of current in its operation, and which will operate to maintain a positively uniform temperature; and, generally, to provide improvements in apparatus of the character stated to the end of rendering them better adapted to perform the functions for which they are intended.

Referring to the accompanying drawings—Figure 1 shows my improved apparatus associated with a radiator, the operation of the valve of which is to be controlled by an electric device for controlling the admission of the heating medium to the radiator under variations in temperature of the air in the room in which the radiator is located, this view being in the nature of a diagram and showing the positions the parts illustrated assume when the valve of the radiator is closed, in which case the air in the room in which the radiator is located would be at the desired temperature. Fig. 2 is a view of a part of the electrically-operated thermostatically-controlled mechanism for operating the valve of the radiator showing the positions assumed by the parts when the valve of the radiator is open, viz., when the temperature of the air in the room in which the radiator is located has dropped below the degree desired. Fig. 3 is a section taken at the line 3 on Fig. 1 and viewed in the direction of the arrow. Fig. 4 is a section taken at the line 4 on Fig. 1 and viewed in the direction of the arrow; and Fig. 5, a longitudinal section taken through certain of the coöperating electrical contacts illustrated in Figs. 1 and 2, showing the contacts in current-conducting position.

As I have devised my invention for use, more particularly, in connection with a radiator for controlling the temperature of the air in the room in which the radiator is located, the following description of the invention will be directed especially to its use in this connection, though it will be understood that my invention may be applied to various other uses.

In the construction illustrated, a portion of the radiator, the valve of which is to be operated under changes of temperature in the room in which the radiator is located, is represented at 6, the pipe for supplying steam, or hot water, to the radiator from a source of supply thereof (not shown) being represented at 7. The pipe 7 opens into a valve-casing 8 provided with a partition 9 containing an opening 10 therein presenting a valve-seat 11, the partition 9 thus dividing the casing into chambers 12 and 13, the chamber 12 connecting with the pipe 7, and the chamber 13 communicating with the interior of the radiator through a pipe 14. Slidably confined in the opening 10 and coöperating with the seat 11, is a valve 15 for controlling the flow of the heating medium from the pipe 7 into the radiator 6. The valve 15 is provided with a depending stem 16 which slides in a guide-bearing 17 provided in the casing 8, a coiled spring 18 surrounding the upper end of the stem 16 and confined between the head of the valve 15 and the guide-bearing 17, tending to seat the valve 15. The lower end of the rod 16 is pivotally connected, as indicated at 18ª, below the guide-bearing 17, to a link 19, the latter being pivotally connected, as indicated at 20, to an arm 21 fixed on a shaft 22 journaled in the casing 8, one end of the rod 22 projecting through a stuffing-box 23 beyond a side of the casing and being rigidly connected with a lever 24, which latter is pivotally connected at its free end, as indicated at 25, to the upper end of a rod 26. The lower end of the rod 26 is pivotally connected, as indicated at 27, to a lever 28 of current-conducting material, such as metal, which latter is fulcrumed, as indicated at 29, to a suitable support (not shown). The free end of the lever 28 is provided with an arm 30, the lower portion of which, at one side thereof, is equipped with ratchet-teeth 31, and set into a face of the arm 30 is a strip of insulating material 32.

It will be understood from the foregoing that the valve 15 and lever 28, by being connected together as stated, operate simultaneously and that when the lever 28 is depressed from the position illustrated in Fig. 1, it will unseat the valve 15 against the action of the spring 18, and thus permit steam to pass from the pipe 7 into the radiator 6.

The means for depressing the lever 28 against the action of the spring 18 comprises an electro-magnet 33 preferably in the form of a solenoid, the core 34 of which is yieldingly held in raised position, illustrated in Fig. 1, by means of a coiled spring 35. The solenoid 33 is located below the lever 28 and opposes a body 36 of magnetizable metal carried by the lever 28, this solenoid operating, when energized as hereinafter described, to depress the lever 28 in opposition to the spring 18 and thereby open the valve 15.

At 37 an electro-magnet is illustrated, the armature of said magnet being represented at 38. The armature 38, which is of bell-crank form, is pivotally supported in any desirable manner at the point 39. The depending arm 40 of the armature 38 is in the form of a tooth located adjacent to the teeth 31 on the lever 28 and adapted to coöperate therewith as hereinafter described. The other arm 41 of the armature, which carries a body 42 of magnetizable material coöperating with the core 43 of the magnet 37, is connected with one end of a coiled spring 44 rigidly held at its opposite end 45 in any suitable manner. The spring 44, when the magnet 37 is deënergized, operates to yieldingly hold the tooth 40 in engagement with the teeth 31, the latter being of such form, as illustrated, as to cause the lever 28 to be depressed without opposition from the tooth 40, as the teeth 31 ride over the latter; but prevent the lever 28 from being raised, until the magnet 37 is energized, by reason of the engagement of the tooth 40 with the teeth 31, a stop 46 serving to limit the downward rocking of the arm 38. It will thus be understood that the lever 28 is free to be depressed to open the valve 15, and will be so operated whenever the solenoid 33 is energized, but that it can not rise from depressed condition to close the valve 15 until the magnet 37 has been energized as hereinafter described.

To accomplish the energizing of the solenoid 33 to draw the lever 28 down to open the valve 15 when the temperature in the room in which the radiator 6 is located, falls below the desired degree, and to lock the lever 28 in depressed condition until the temperature in the room rises to the desired degree, I provide mechanism and electric circuit connections, of which the following is a description: Located in the room, the temperature of the air in which is to be controlled and in which the radiator 6 is located, is an electric thermostat, which preferably is of the make-and-break thermometer type, such as that represented at 47. The thermometer illustrated comprises a mercury tube 48, containing mercury 49, into the bulb of which tube and into contact with the mercury therein a wire 50 extends, the wire 50 having interposed therein and being in circuit with, an electro-magnet 51 and a source of electric-current supply, as for example a battery represented at 52, and connecting with a switch 53 coöperating with contacts 54, 55 and 56, these contacts being connected with wires 57, 58 and 59 which extend into the tube 48 at different points along the same and into the path of movement of the mercury therein. The armature of the magnet 51, which is represented at 60 and operates as a switch, is fulcrumed, as indicated at 61, on any suitable support, one end thereof coöperating with the core 62 of the magnet 51, and the other end, which is connected with a coiled spring 63 tending to swing its upper end away from the core 62, coöperating with contacts 64 and 65, stops 66 and 67 extending into the path of movement of the armature 60 operating to limit the movements of the switch-arm 60 in opposite directions. The lever 28 carries one of two of the coöperating members 68 of a contact-device 69, the other one of the members 68 being rigidly secured in stationary position to any suitable support. Each of the members 68 is formed of a spring-arm 70, one of these arms carrying a socket-member 71 provided with a cap 72 equipped with an annular flange 73, the socket 71 containing a plunger 74 yieldingly outwardly spring-pressed by a spring 75 and sliding at its outer reduced end 76 in an opening 77 in the cap 73. The other spring-arm 70 carries a socket-member 78 provided with a cap 79 and containing a plunger 80 backed up by a spring 81 and extending at its reduced end 82 through an opening 83 in the cap 79, the members 71 and 78 being so arranged that the outer ends 76 and 82 of the plungers carried thereby, will abut and the springs 75 and 81 will be compressed when the members 68 are drawn together and will be releasably locked in abutting condition by spring-arms 84 carried by the member 78 and provided with shoulders 85 adapted to engage with the flange 73 as illustrated in Fig. 5.

The circuit connections for controlling the operation of the electro-magnets 33 and 37 are as follows: A wire 86 leads from the contact 65 to the contact 64, the magnets 33 and 37 being interposed in this wire. A wire 87 is connected at one end with the lever 28 and at its other end with the wire 86 intermediate the solenoid 33 and magnet 37. A wire 88 in circuit with a source of electrical supply, as for example the battery represented at 89, leads from the switch-arm 60 to a stationary contact 90, which latter is preferably formed of spring-metal and is supported to yieldingly bear against that surface of the arm 30 which contains the insulating section 32, a wire 91, connected with the wire 88 between the battery 89 and contact 90, connecting with the contact-member 68 carrying the plunger 74.

In Fig. 1 the valve 15 and the electrically-operated mechanism for controlling this valve are represented in the positions they assume after the mercury 49 has made contact in the thermometer-tube with the terminal therein, in the case illustrated this being the wire 58, and after the parts of the apparatus have been operated to permit the valve 15 to close under the action of the spring 18. Assuming that the parts of the apparatus are in the positions illustrated, as soon as the temperature of the air surrounding the thermometer 47 has dropped to a point sufficient to cause the mercury 49 to drop below the wire 58 in the tube 48, the circuit through the magnet 51 is broken, thereby allowing the spring 63 to swing the switch-arm 60 into engagement with the contact 65, with the result of causing current from the battery 89 to pass through the wire 88, switch-arm 60, contact 65, wire 86 to the solenoid 33, thence through the solenoid to the wire 87, thence through the lever 28 and contact-device 68 and wire 91 to the battery 89. The circuit thus established causes the solenoid 33 to be energized, with the result of drawing the core 34 into the coil of the solenoid and depressing the arm 28 and opening the valve 15. The solenoid 33 continues to depress the lever 28 until the contacts 68 separate, and as the latter are formed of the spring-arms 70 as described, they will remain in contact with each other until the lever 28 has been depressed sufficiently far to fully open the valve 15. When the tension of the arms 70 tending to separate the contacts 68 becomes sufficiently great to disengage the shoulders 85 from the flange 73, the members 68 will quickly separate, and when the lever 28 comes to rest in depressed condition will be widely spaced apart as represented in Fig. 2. Thus any tendency to arcing between the contacts 68, when separating, is prevented. In the downward movement of the lever 28 as described, its teeth 31 ride against the tooth 40, and when the lever 28 comes to rest the contact 90 will lie against the metallic part of the arm 30 as illustrated in Fig. 2. As soon as the circuit through the solenoid 33 is broken by the separation of the contacts 68, the tooth 40 interlocks with the tooth 31 which it opposes, thereby locking the lever 28 in depressed condition, in which the valve 15 is open. The parts of the apparatus remain in the last referred to position until the temperature of the air surrounding the thermometer 47 rises sufficiently to cause the mercury 49 to contact with the wire 58, whereupon the magnet 51 is energized, thereby shifting the lever 60 into engagement with the contact 64. Thus shifting the lever 60 will cause current to pass from the battery 89 through the wire 88, switch-arm 60, contact 64, wire 86 and magnet 37 to the wire 87, thence through the lever 28, contact 90 and over wire 88 to the battery 89. The effect of establishing the circuit just described is to energize the magnet 37, which results in attracting its armature 38 against the action of the spring 44 and withdrawing the tooth 40 from engagement with the tooth 31. As soon as the tooth 40 is disengaged from the tooth 31, the spring 18 is allowed to act, returning the valve 15, lever 28 and the parts connected with said valve and lever to raised position (Fig. 1), in which the valve 15 is closed. The movement of the lever 28 to the position described causes the contact-members 68 to interlock with each other as illustrated in Fig. 1, and the insulated portion 32 of the armature 30 to be brought into engagement with the contact 90, thereby breaking the circuit through the magnet 37. The parts of the apparatus remain in the condition illustrated in Fig. 1 until the temperature of the air surrounding the thermometer 47 again drops sufficiently to cause the mercury 49 to be moved out of contact with the wire 58, whereupon the switch-arm 60 swings over, under the influence of the spring 63, into engagement with the contact 65, and the operations hereinbefore described are repeated.

It will be noted that excepting for the slight amount of current that is required to hold the switch 60 in one position in opposition to the spring 63 when the mercury is in engagement with the wire 58, no current is required excepting that which is necessary for momentarily operating the solenoid 33 and the electro-magnet 37, as during the intervals between the operation of the solenoid 33 and magnet 37 for alternately drawing the lever 28 down and releasing the latter, no current passes through this solenoid and magnet, as distinguished from those constructions in which the part to be operated by the apparatus is held in a given position by continuous energization of a magnet.

What I claim as new, and desire to secure by Letters Patent, is:—

1. In apparatus of the character described, the combination with a movable member forming the controlling element of a temperature-producing apparatus and tending to occupy a predetermined position and tending at all times to return to said position when moved therefrom, of thermostatically-controlled, electrically-operated means for moving said member out of predetermined position when the temperature to which said means are subjected reached a certain degree, means for breaking the circuit through said electrically-operated means and releasable means for holding said member in the position to which it is moved when the latter is actuated by said electrically operated means, and thermostatically-controlled, electrically-operated means for releasing said releasable means when the temperature to be controlled reaches a certain degree.

2. In apparatus of the character described, the combination with a reciprocable valve controlling the flow of a temperature-regulating medium, and means tending to hold said valve in one position and tending at all times to return to closed condition when moved therefrom, of thermostatically-controlled, electrically-operated means for moving said valve in opposition to said first-named means when the temperature reaches a certain degree, means for breaking the circuit through said electrically-operated means upon actuation of said valve in opposition to said first-named means, releasable-means for holding said valve in position in opposition to said first-named means, and thermostatically-controlled, electrically-operated means for releasing said releasable means to permit said valve to be returned by said first-named means, when the temperature reaches a certain degree.

3. In apparatus of the character described, the combination with a reciprocable valve controlling the flow of a temperature-regulating medium and means tending to hold said valve in closed condition and tending to close said valve when the latter is open, of thermostatically-controlled, electrically-operated means for opening said valve when the temperature falls below a certain degree, means operating in opposition to said first-named means for breaking the circuit through said electrically-operated means upon the opening of said valve, releasable-means for holding said valve in open condition in opposition to said first-named means, and thermostatically-controlled, electrically-operated means for releasing said releasable-means to permit the valve to close when the temperature reaches said certain degree.

4. In apparatus of the character set forth, the combination with a movable member to be actuated under varying temperatures and means tending to hold said movable member in a predetermined position and tending at all times to return said member to said position when moved therefrom, of a rock-member operatively connected with said movable member, thermostatically-controlled, electrically-operated means for moving said rock-member in opposition to said first-named means, means for breaking the circuit through said electrically-operated means upon the actuation of said rock-member, releasable-means for holding said rock-member against return movement under the action of said first-named means, and thermostatically-controlled, electrically-operated means for releasing said releasable-means to permit said rock-member to be returned under the action of said first-named means.

5. In apparatus of the character set forth, the combination with a movable member to be actuated under varying temperatures, and means tending to hold said movable member in a predetermined position and tending at all times to return said member to said position when moved therefrom, of a pivotally-supported rock-lever operatively connected with said movable member, thermostatically-controlled, electrically-operated means for operating said rock-lever in opposition to said first-named means, means for breaking the circuit through said electrically-operated means after actuation of said rock-lever, a locking-device coöperating with said rock-lever and operating to releasably lock the latter against return movement under the action of said first-named means, and thermostatically-controlled, electrically-operated means for disengaging said locking-device from said lever to permit the latter to be returned by said first-named means.

6. In apparatus of the character set forth, the combination with a movable member to be actuated under varying temperatures and means tending to hold said member in a predetermined position and tending at all times to return said member to said position when moved therefrom, of a shiftable member operatively connected with said movable member for moving it in opposition to said first-named means, electric circuits, an electric thermostat and an electrically-operated switch controlled by the making and breaking of electrical connections in said thermostat under variations of temperature to which the thermostat is subjected, to alternately close said circuits, electrically-operated means in one of said circuits for moving said movable member in opposition to said first-named means, separable contacts in said last referred to circuit separable upon movement of said shiftable-member to actuate said movable member and operating to break said last referred to circuit, releasable-means for holding said shiftable member against return movement and in opposition to the action of said first-named means, and electrically-operated means in the other of said circuits for releasing said releasable means when said last referred to circuit is closed, for permitting said shiftable member to return under the action of said first-named means.

7. In apparatus of the character set forth, the combination with a movable member to be actuated under varying temperatures and means for holding said member in a predetermined position and tending at all times to return said member to said position when moved therefrom, of a shiftable member operatively connected with said movable member for moving it in opposition to said first-named means, electric circuits, an electric thermostat and an electrically-operated switch controlled by the making and breaking of electrical connections in said thermostat under variations of temperature to which the thermostat is subjected, to alternately close said circuits, electrically-operated means in one of said circuits for moving said movable member in opposition to said first-named means, separable contacts in said last referred to circuit separable upon movement of said shiftable-member to actuate said movable member and operating to break said last referred to circuit, releasable-means for holding said shiftable member against return movement and in opposition to the action of said first-named means, electrically-operated means in the other of said circuits for releasing said releasable means when said last-referred to circuit is closed, for permitting said shiftable member to return under the action of said first-named means, and separable contacts in said last referred to circuit, movable into engagement with each other when said shiftable-member is moved in opposition to said first-named means and separable when said shiftable member is returned under the action of said first-named means.

8. In apparatus of the character set forth, the combination with a movable member to be actuated under varying temperatures and means for holding said member in a predetermined position and tending at all times to return said member to said position when moved therefrom, of a shiftable member operatively connected with said movable member for moving it in opposition to said first-named means, electrical circuits, an electric thermostat and an electrically-operated switch controlled by the making and breaking of electrical connections in said thermostat under variations of temperature to which the thermostat is subjected, to alternately close said circuits, electrically-operated means in one of said circuits for moving said shiftable-member in opposition to said first-named means, means for breaking said last referred to circuit upon the operation of said shiftable-member in opposition to said first-named means, releasable-means for holding said shiftable member against return movement and in opposition to the action of said first-named means, and electrically-operated means in the other of said circuits for releasing said releasable means when said last referred to circuit is closed, for permitting said shiftable member to return under the action of said first-named means.

9. In apparatus of the character set forth, the combination with a movable member to be actuated under varying temperatures and means for holding said member in a predetermined position and tending at all times to return said member to said position when moved therefrom, of a shiftable member operatively connected with said movable member for moving it in opposition to said first-named means, electrical circuits, an electric thermostat and an electrically-operated switch controlled by the making and breaking of electrical connections in said thermostat under variations of temperature to which the thermostat is subjected, to alternately close said circuits, electrically-operated means in one of said circuits for moving said shiftable member in opposition to said first-named means, means for breaking said last referred to circuit upon the operation of said shiftable-member in opposition to said first-named means, releasable-means for holding said shiftable member against return movement and in opposition to the action of said first-named means, electrically-operated means in the other of said circuits for releasing said releasable means when said last referred to circuit is closed, for permitting said shiftable member to return under the action of said first-named means, and means for breaking said last referred to circuit after the operation of releasing said releasable means.

10. In apparatus of the character set forth, the combination with a movable member to be actuated under varying temperatures and means tending to hold said movable member in a predetermined position and tending at all times to return said member to said position when moved therefrom, separately controlled electrical circuits, an electric thermostat and a switch operated by the making and breaking of electrical connections in said thermostat for alternately closing said circuits, a shiftable-member operatively connected with said movable member, separable contacts in one of said circuits, one of said contacts being carried by said shiftable-member, electrically-operated means in said last referred to circuit for actuating said shiftable-member in opposition to said first-named means, said contacts being separable to break said last referred to circuit upon actuation of said electrically-operated means, releasable-means for locking said shiftable-member against return movement under action of said first-named means, electrically-operated means in the other of said circuits for actuating said releasable means to free said shiftable-member and permit the latter to be returned under the action of said first-named means, and separate, relatively-movable contacts in said last referred to circuit movable into engagement when said shiftable-member is operated in opposition to said first-named means and movable out of engagement upon the return movement of said shiftable-member under the action of said first-named means.

11. In apparatus of the character set forth, the combination with a movable member to be actuated under varying temperatures and means tending to hold said movable member in a predetermined position and tending at all times to return said member to said position when moved therefrom, of a shiftable-member operatively connected with said movable member for moving it in opposition to said first-named means, electric-thermostat-controlled, electrically-operated means for moving said member in opposition to said first-named means, means for breaking the circuit through said electrically-operated means upon actuation of said shiftable-member, ratchet-mechanism for releasably holding said shiftable-member against return movement under the action of said first-named means, and electric-thermostat-controlled, electrically-operated means for actuating said ratchet-means to release said shiftable member and permit it to return under the action of said first-named means.

12. In apparatus of the character set forth, the combination with a movable member to be actuated under varying temperatures and means tending to hold said movable member in a predetermined position and tending at all times to return said member to said position when moved therefrom, of a shiftable-member operatively connected with said movable member for moving it in opposition to said first-named means, electric-thermostat-controlled, electrically-operated means for moving said shiftable member in opposition to said first-named means, means for breaking the circuit through said electrically-operated means upon actuation of said shiftable-member, ratchet-mechanism for releasably holding said shiftable-member against return movement under the action of said first-named means, and an electric-thermostat-controlled electro-magnet operating to actuate said ratchet-mechanism for releasing said shiftable member to permit the latter to be returned by said first-named means.

13. In apparatus of the character set forth, the combination with a movable member to be actuated under varying temperatures and means tending to hold said movable member in a predetermined position and tending at all times to return said member to said position when moved therefrom, of a shiftable-member operatively connected with said movable member for moving it in opposition to said first-named means, electric-thermostat-controlled, electrically-operated means for moving said shiftable member in opposition to said first-named means, means for breaking the circuit through said electrically-operated means upon actuation of said shiftable-member, a ratchet movable with said shiftable member, a pivotally-supported pawl coöperating with said ratchet, means tending to hold said pawl in engagement with said ratchet for releasably locking said shiftable member against return movement, and an electric-thermostat-controlled electro-magnet operating, when energized, to disengage the pawl from said ratchet, for the purpose set forth.

14. In apparatus of the character set forth, the combination of a shiftable member, and separable contacts the support for one of which is stationary with relation to said shiftable-member and the other of said contacts is operatively connected with said shiftable member, means tending to separate said contacts upon movement of said shiftable member, and means for holding said contacts in engagement with each other, in opposition to said first-named means to place the latter under tension, during a portion of the movement of said shiftable member.

15. In apparatus of the character set forth, the combination of a shiftable member, and separable contacts the support for one of which is stationary with relation to said shiftable member and the other of said contacts is operatively connected with said shiftable member, means tending to separate said contacts upon movement of said shiftable member, and spring-means for holding said contacts in engagement with each other, in opposition to said first-named means to place the latter under tension, during a portion of the movement of said shiftable member.

16. In apparatus of the character set forth, the combination of a shiftable member, and separable contacts the support for one of which is stationary with relation to said shiftable member and the other of said contacts is operatively connected with said shiftable member, said contacts being formed of spring-arms carrying the contact-pieces and operating to be placed under tension when said shiftable member is moved, and means for holding said contacts in engagement with each other, during a portion of the movement of said shiftable member.

17. In apparatus of the character set forth, the combination of a shiftable member, and separable contacts the support for one of which is stationary with relation to said shiftable member and the other of said contacts is operatively connected with said shiftable member, said contacts being formed of spring-arms carrying the contact-pieces and operating to be placed under tension when said shiftable member is moved, and spring-means for holding said contacts in engagement with each other, in opposition to the action of said spring-arms, during a portion of the movement of said shiftable member.

18. In apparatus of the character set forth, the combination of a shiftable-member, and separable contacts the support for one of which is stationary with relation to said shiftable member and the other of said contacts is operatively connected with said shiftable member, one of said contacts being formed of relatively movable members, tensioning-means between said members and the support therefor, said last-named tensioning-means being adapted to be placed under tension when said contacts are in position of mutual engagement, and means for holding said contacts in engagement with each other in opposition to said first-named tensioning-means during a portion of the movement of said shiftable member.

19. In apparatus of the character set forth, the combination of a shiftable-member, and separable contacts the support for one of which is stationary with relation to said shiftable-member and the other of said contacts is operatively connected with said shiftable member, each of said contacts being formed of casings, tensioning-means coöperating with said casings, contact-pieces slidable on said casings, springs coöperating with said casings and with said contact-pieces and tending to project the latter toward each other, and means for holding said contact-pieces in engagement with each other and in opposition to said tensioning-means and against the resistance of said springs during a portion of the movement of said shiftable-member.

20. In apparatus of the character set forth, the combination of a shiftable-member, and separable contacts the support for one of which is stationary with relation to said shiftable-member and the other of said contacts is operatively connected with said shiftable member, each of said contacts being formed of a spring-arm, a member carried by said spring-arm, a contact-piece slidable on said member, and a spring, said springs tending to force the contact-pieces toward each other, and means carried by one of said contact-members for holding said contact-pieces in engagement with each other, with said springs compressed, and in opposition to the action of said spring-arms, during a portion of the movement of said shiftable member.

MICHAEL J. BRIERTY.

In presence of—
  A. N. THORIEN,
  R. A. SCHAEFER.

---

Copies of this patent may be obtained for five cents each, by addressing the "Commissioner of Patents, Washington, D. C."